(12) United States Patent
Roberts et al.

(10) Patent No.: US 6,416,286 B1
(45) Date of Patent: Jul. 9, 2002

(54) SYSTEM AND METHOD FOR SECURING A RADIALLY INSERTED INTEGRAL CLOSURE BUCKET TO A TURBINE ROTOR WHEEL ASSEMBLY HAVING AXIALLY INSERTED BUCKETS

(75) Inventors: Dennis William Roberts, Schenectady; David Alan Caruso, Ballston Lake; Joseph Michael Pelech, Rexford; Kiernan Francis Ryan, Niskayuna; James Harvey Vogan, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 26 days.

(21) Appl. No.: 09/749,446

(22) Filed: Dec. 28, 2000

(51) Int. Cl.[7] .................................................. F01D 5/30
(52) U.S. Cl. ................... 416/191; 416/220 R; 416/248; 29/889.21
(58) Field of Search ............................ 416/191, 212 A, 416/219 R, 220 R, 204 A, 248; 29/889.21

(56) References Cited

U.S. PATENT DOCUMENTS

| | | | | |
|---|---|---|---|---|
| 2,801,074 A | * | 7/1957 | Brown | 416/221 |
| 3,198,485 A | * | 8/1965 | Melenchuk | 416/220 R |
| 3,627,448 A | * | 12/1971 | Rupp et al. | 416/220 R |
| 4,778,342 A | * | 10/1988 | Conlow | 416/220 R |
| 5,509,784 A | | 4/1996 | Caruso et al. | |
| 6,030,178 A | | 2/2000 | Caruso | |
| 6,190,131 B1 | * | 2/2001 | Deallenbach | 416/144 |

* cited by examiner

Primary Examiner—Edward K. Look
Assistant Examiner—Ninh Nguyen
(74) Attorney, Agent, or Firm—Banner & Witcoff, Ltd.

(57) ABSTRACT

A system and method for securing an integral closure bucket to a rotor wheel assembly. The integral closure bucket is inserted in a direction coincident with a radius of the rotor wheel assembly, where the remaining buckets have been previously inserted in a direction parallel to the axis of the turbine rotor wheel. The closure bucket has an integral shroud and is connected to a turbine rotor wheel assembly in which the remaining buckets have been previously inserted in an axial direction. The buckets adjacent the closure bucket are spread apart both tangentially and axially to provide sufficient clearance for the radial insertion of the integral closure bucket. To prevent axial movement of the closure bucket and adjacent buckets, twist locks are utilized in channels provided in the bottom of the female dovetails in the rotor wheel.

31 Claims, 4 Drawing Sheets

SYSTEM AND METHOD FOR SECURING A RADIALLY INSERTED INTEGRAL CLOSURE BUCKET TO A TURBINE ROTOR WHEEL ASSEMBLY HAVING AXIALLY INSERTED BUCKETS

FIELD OF THE INVENTION

The present invention relates to a system and method for securing an integral closure bucket to a rotor wheel assembly. The integral closure bucket is inserted in a direction coincident with a radius of the rotor wheel assembly, where the remaining buckets have been previously inserted in a direction parallel to the axis of the turbine rotor wheel. More particularly, the present invention relates to a system and method for securing a closure bucket, having an integral shroud or closure, into a turbine rotor wheel assembly in which the remaining buckets can be axially inserted.

The buckets adjacent the closure bucket may be spread apart both tangentially and axially to provide sufficient clearance for the radial insertion of the integral closure bucket. Since the closure bucket is inserted radially, both the closure bucket and the adjacent buckets cannot be secured together with keys in the normal fashion, to prevent axial movement of the buckets. As a result, twist locks can be utilized to keep the buckets adjacent to the closure bucket from moving axially after assembly.

BACKGROUND OF THE INVENTION

In the assembly of a turbine rotor wheel, the rotor blades, also known as buckets can be attached to the turbine rotor wheel by moving the buckets axially so that male dovetails on the buckets slide into mating female dovetails on the turbine rotor wheel. Both the male and female dovetails may be oriented to be parallel to the axis of the turbine rotor wheel.

Turbines wheels with buckets having integral covers or shrouds formed on their distal ends are known, as shown in U.S. Pat. No. 6,030,178, to Caruso, and assigned to Assignee of the present application, which is incorporated herein by reference. The shrouds have an approximately Z-shaped configuration so that the shroud of adjacent buckets nest with one another. As a result, when all the buckets are assembled on the turbine rotor wheel, the shrouds nest tightly with the adjacent shrouds creating a continuous circumferential coupling.

In operation, the buckets experience vibrational stresses that can reduce the turbine's efficiency and lower the life expectancy of the bucket. One method for reducing the vibrational stress is to interlock the ends of the buckets with shrouds. In order to be effective, the shrouds should maintain sufficient contact between adjacent shrouds all the way around the circumference of the turbine rotor wheel. During operation of the turbine, centrifugal forces cause the radial growth and twisting of the buckets. To counteract these effects, the buckets and their covers can be assembled with compressive contact force between adjacent buckets.

Construction of turbine rotor wheels having radial-entry buckets is accomplished by assembling the buckets serially around the turbine rotor wheel so that the approximately Z-shaped shrouds nest with one another. However, when all the buckets, except the bucket, are assembled the shrouds on the first and next to buckets prevent axial insertion of the closure bucket. Consequently, the closure bucket must be inserted radially.

The patent to Caruso et al. teaches securing the closure bucket by employing an axial entry dovetail segment having generally radially opposite male dovetails extending generally in the axial direction. The turbine rotor wheel has conventional female dovetails at spaced positions about its circumference for receiving the male dovetails on the buckets or the axial entry dovetail segment. Instead of having a male dovetail, the closure bucket has a female dovetail to accept the male dovetail of the axial entry dovetail segment.

The foregoing construction has drawbacks. In particular, the z-shaped shrouds are designed to fit together very tightly. As a result, the clearance between the shrouds on the buckets adjacent the closure bucket location is insufficient to permit radial insertion of the closure bucket. The clearance is insufficient in both the axial and tangential directions.

Furthermore, in the turbine rotor wheel configuration taught in Caruso et al., the buckets are prevented from moving axially out of the female dovetails in the turbine rotor wheel by keys disposed in grooves in the outer circumference of the turbine rotor wheel and recesses in the sides of the buckets. However, due to the radial insertion of the closure bucket, it may not be possible to insert the keys the recesses of the closure bucket. Furthermore, while such keys can be used to secure most of he buckets around the circumference of the turbine rotor wheel, and the use of these keys further limits any axial movement of the buckets, they compound the radial insertion problem of the closure bucket.

BRIEF SUMMARY OF THE INVENTION

The foregoing and other deficiencies of the conventional techniques are addressed by the system and method for securing an integral closure bucket to a turbine rotor wheel assembly of the present invention.

The present invention relates to a system and method for securing a radially inserted integral closure bucket to a turbine rotor wheel assembly. According to the assembly method the buckets, adjacent the closure bucket location on the turbine rotor wheel, can be spread apart from one another in both an axial and tangential direction to provide sufficient clearance for the radial insertion of the closure bucket. To provide the necessary clearance between the adjacent buckets in the tangential direction, a spreading fixture may be employed. The spreading fixture attaches to each of the adjacent buckets and can be adjusted to exert outward tangential force on each of the adjacent buckets so that the tangential clearance between the adjacent buckets increases enough to allow insertion of the closure bucket. Simultaneously, hydraulic jacks may be employed to move the adjacent buckets in opposing axial directions. One hydraulic jack moves a trailing bucket in a first axial direction while a second hydraulic jack moves a leading bucket in an opposite axial direction. Thus, the spreading fixture and hydraulic jack open sufficient tangential and axial clearance between the leading and trailing buckets to allow radial insertion of the closure bucket. Once the closure bucket is properly situated, the spreading fixture and hydraulic jacks can be removed.

In order to ensure that the leading and trailing buckets can be moved a sufficient distance to permit the insertion of the closure bucket, the conventional locking keys are not used. Instead, channels may be milled in the bottoms of the female dovetails in the turbine rotor wheel. Twist locks can be inserted in these channels. Prior to insertion of the closure bucket, the twist locks can be unlocked, so that the trailing and leading buckets can be spread apart. Once the closure bucket is properly situated, the twist locks may be rotated 180 degrees to prevent the leading and trailing buckets from moving axially. A twist lock is also used to secure the closure bucket. In order to provide enough play between the leading and trailing buckets to obtain sufficient clearance for the closure bucket, up to three leading and three trailing buckets may have twist locks provided in milled channels.

BRIEF DESCRIPTION OF THE DRAWINGS

The structure, operation and advantages of the presently preferred embodiment of this invention will become apparent upon consideration of the following description, taken in conjunction with the accompanying drawings in which.

DETAILED DESCRIPTION OF THE INVENTION

Figure 1:
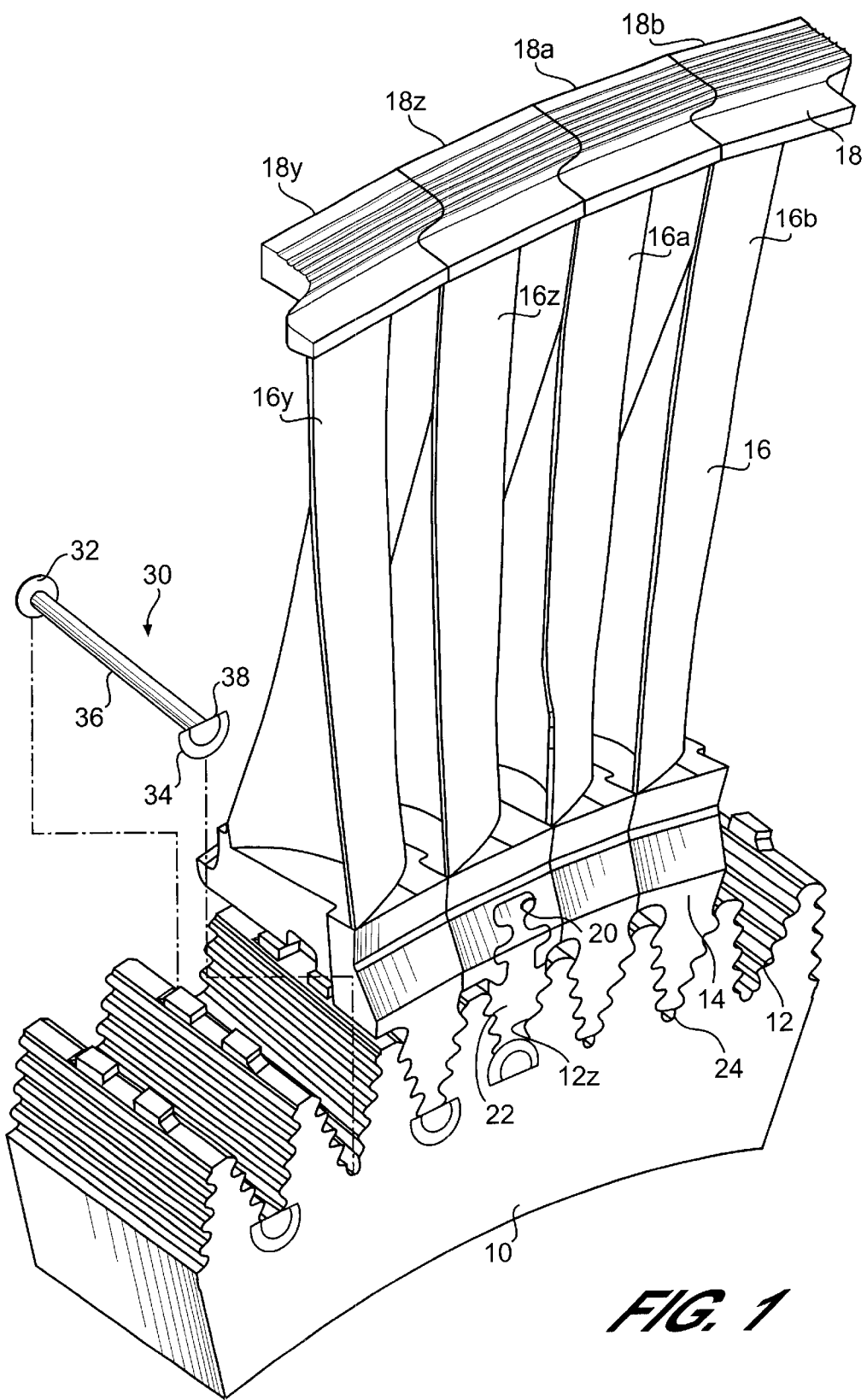
FIG. 1 is a fragmentary perspective view illustrating the connections between the buckets and turbine rotor wheel, axial entry dovetail segment, and twist locks according to an exemplary embodiment of the present invention used to secure the leading, trailing and closure buckets.

Referring to FIG. 1, a portion of a turbine rotor wheel 10 having female dovetails 12 is shown. The female dovetails 12 may be spaced at even intervals around the entire circumference of the rotor wheel 10. The female dovetails 12 extend in an axial direction, e.g., parallel to the axis of the rotor wheel 10. The female dovetails 12 receive mating male dovetails 14 formed on the inner ends of the buckets 16. In the construction process of the complete turbine rotor wheel, the male dovetails 14 on the radial inner ends of the buckets 16 slide axially into the mating female dovetails 12 on the rotor wheel 10.

The buckets 16 have integral shrouds or covers 18 at the radial outer or distal ends that on completion of the assembly process contact one another to maintain a continuous circumferential shroud assembly. During operation of the turbine, centrifugal forces cause radial growth and twisting of the buckets 16. To counteract such forces, each shroud 18 should maintain sufficient contact with adjacent shrouds 18 all the way around the circumference of the turbine rotor wheel 10. To counteract these effects, the buckets 16 and their shrouds 18 may be assembled with compressive contact force between adjacent buckets 16.

The shrouds 18 have an approximately or generally Z-shaped configuration as viewed in a radial direction. The shrouds 18 interlock or nest with the adjacent shrouds 18. Earlier designs used covers that were peaned onto buckets. As a consequence, the thickness of the covers was limited. If the covers were too thick they could not be peaned on. The provision of integral shrouds 18 eliminated the thickness limitation. As a result, the shrouds may have grooves 60 formed in their outer face. When the turbine rotor wheel is fully assembled, the shrouds 18 form a continuous ring, and the grooves 60 form corresponding continuous circumferential grooves. Such continuous circumferential grooves allow the insertion of seals on the outer circumferential face.

The buckets 16 are assembled serially around the rotor wheel 10. In particular, the bucket 16a is the first bucket attached to the rotor wheel 10, followed by a bucket 16b, until bucket 18y is attached. Adjacent shrouds 18a, 18b, etc. nest with one another upon the axial insertion of buckets 16a, 16b, etc.

Figure 2:
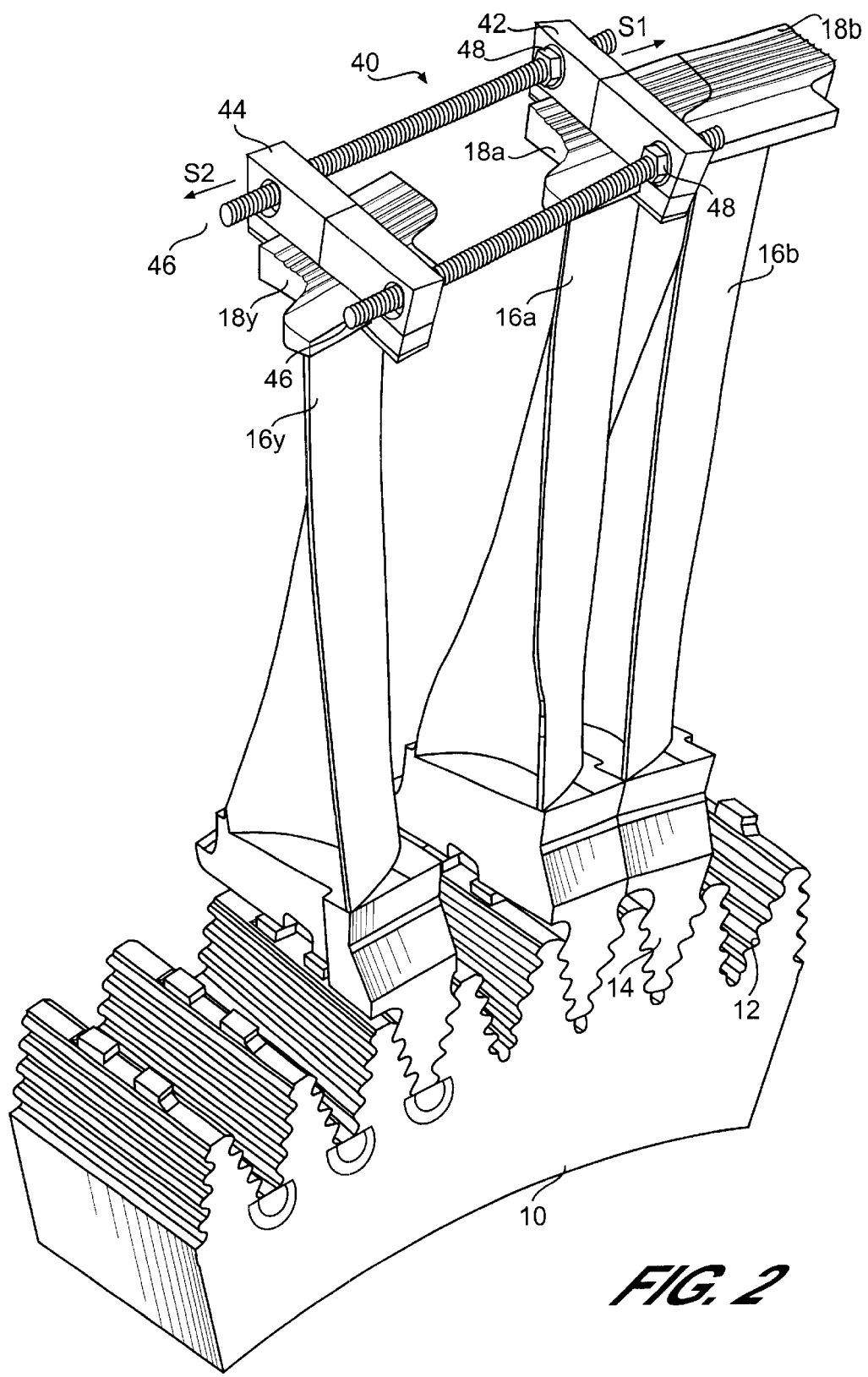
FIG. 2 is a fragmentary perspective view illustrating a trailing and two leading buckets connected to the turbine rotor wheel with a spreading fixture attached to the trailing and leading buckets, with the closure bucket removed according to an exemplary embodiment of the present invention.

FIG. 2 shows buckets 16y, 16a, and 16b attached to the rotor 10. The remaining buckets 16c–16x, are not shown. The number of buckets on the turbine is not limited to twenty-six, and can be greater or fewer, the reference numbering herein is merely used for illustrative purposes. The closure bucket 16z shown in FIG. 1 is not yet inserted in FIG. 2. From FIG. 2 it can be seen that the closure bucket 16z cannot be inserted into the gap between leading bucket 16a and trailing bucket 16y from either axial direction because the shroud 18z cannot pass through the opening defined by the adjacent covers 18a and 18y. Consequently, the closure bucket is inserted radially.

Instead of providing the closure bucket 16z with a male dovetail similar to the dovetails 14 on the inner ends of the other buckets 16, the closure bucket 16z can be provided with an axially extending female dovetail 20 along its radial inner end. An axial entry dovetail segment 22 is provided for joining the closure bucket 16z to the rotor 10. The axial entry dovetail segment 22 has male projecting dovetails on radially opposite sides.

In the assembly process, the closure bucket 16z in inserted radially between the leading bucket 16a and the trailing bucket 16y, until the base of the closure bucket 16z is disposed between the base of leading bucket 16a and the base of the trailing bucket 16y. The shroud 18z will likewise nest between the shrouds 18a and 18y of the leading and trailing buckets 16a and 16y, respectively. The closure bucket can be secured by inserting the axial entry segment axially so that the male dovetails of the axial entry segment mate with female dovetails 20 and 12z.

The foregoing assembly process would be sufficient if the shrouds 18 nested together loosely. This is not the case. Rather the shrouds 18 nest together in an extremely tight fashion upon completion of the assembly process. The shrouds 18 exert significant pressure on adjacent shrouds both tangentially and axially. As a consequence, the gap between the shroud 18a of the leading bucket 16a and the shroud 18y of the trailing bucket 16y may be insufficient to permit radial insertion of the closure bucket 16z.

To overcome this problem, an exemplary embodiment of the present invention moves the leading bucket 16a and trailing bucket 16y apart both tangentially and axially. A spreading mechanism 40, shown in FIGS. 2–4, can be provided to move the leading bucket 16a and trailing bucket 16y apart tangentially. The spreading mechanism 40 has a pair of clamps 42 and 44, which attach to the shroud 18a of the leading bucket 16a and the shroud 18y of the trailing bucket 16y, respectively. A spreading fixture that includes a pair of threaded rods 46 and nuts 48 threaded on the rods 46 connects the clamps 42 and 44.

In operation, the clamps 42 and 44 can be attached to the shroud 18a of the leading bucket 16a and the shroud 18y of the trailing bucket 16y, respectively, with the rods 46 extending through pairs holes in each of the clamps 42 and 44. The nuts 48 may be threaded onto the rods 46 before the insertion of the rods 46 into the holes in the clamps 42 and 44. The nuts 48 are rotated until they contact the clamps 42 and 44. Each turn of the nuts 48 that moves the nuts outward towards the ends of the rods 46 exerts force tangentially onto the clamps 42 and 44 in the direction of arrows S1 and S2. As a result, the shrouds 18a and 18y move apart tangentially thereby increasing the tangential space between the shrouds 18a and 18y.

After the closure bucket 16z is inserted between the leading bucket 16a and trailing bucket 16y, the spreading mechanism 40 can be loosened by turning the nuts 48 so that they move away from the ends of the rods 46.

Figure 3:
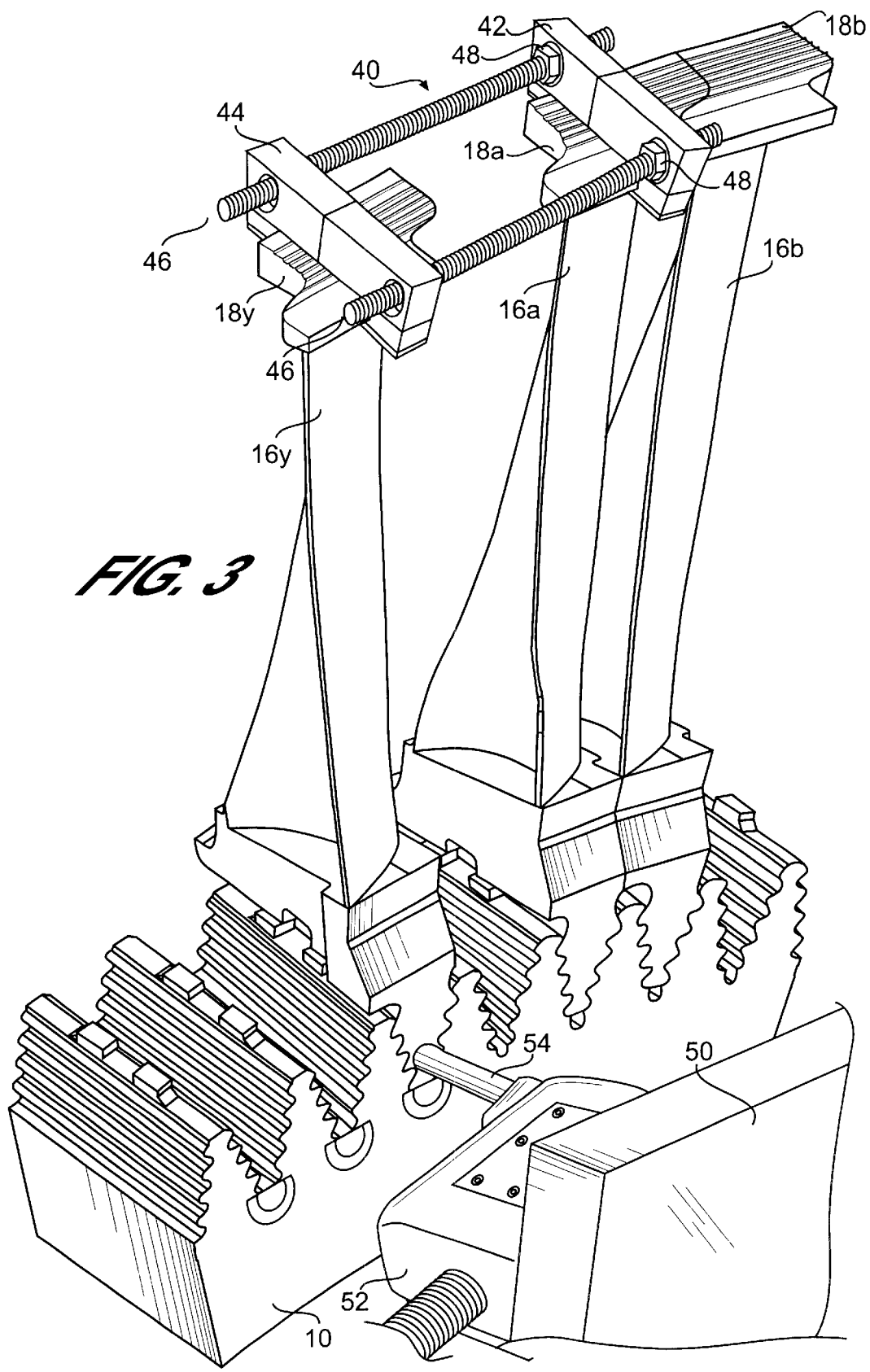
FIG. 3 is the same fragmentary perspective view shown in FIG. 2 with a hydraulic jack positioned adjacent the trailing bucket according to an exemplary embodiment of the present invention.
Figure 4:
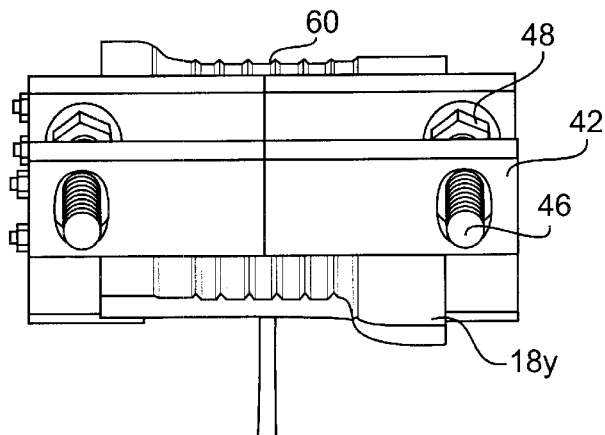
FIG. 4 is a partial cross-sectional view showing the turbine rotor wheel, trailing bucket, spreading fixture, and opposing hydraulic jacks disposed between fixture plates and the leading and trailing buckets according to an exemplary embodiment of the present invention.
Figure 4:
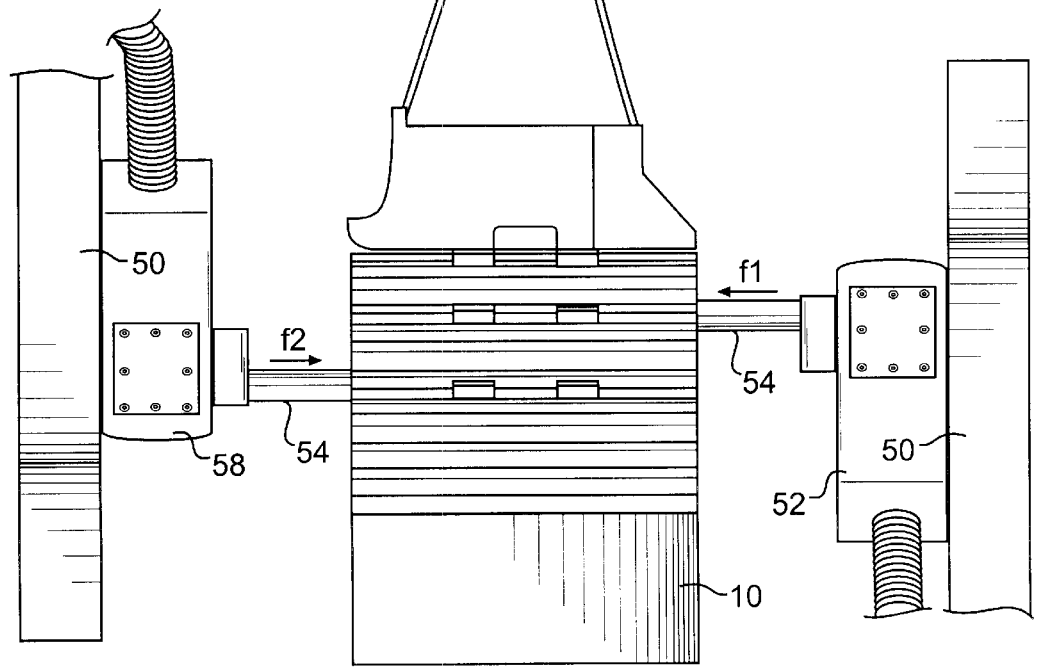

Similarly, the shroud 18a of the leading bucket 16a and the trailing shroud 18y of the trailing bucket 16y are moved apart axially, using the hydraulic-jacks 52 and 58 shown in FIGS. 3 and 4. In order to provide the hydraulic jacks 52 and 58 a base to push against, leverage plates 50 may be attached to the rotor 10. In an instance where the multiple rotor wheels are mounted on the same axis, an adjacent rotor wheel (not shown) may be employed to provide the base against which a hydraulic jack can push.

Referring to FIG. 3, the hydraulic jack 52 can be positioned so that the tip 54 presses against the male dovetail 14 of the trailing bucket 16y. Similarly, the hydraulic jack 58 can be positioned so that the tips 54, shown in FIG. 4, can be disposed against the male dovetail 14 of the leading bucket 16a. When the hydraulic jacks 52 and 58 are activated, they exert force in opposing axial directions as indicated by arrows f1 and f2 in FIG. 4. As a consequence, the shroud 18a of the leading bucket 16a and the shroud 18y of the trailing bucket 16y are moved apart axially as their respective buckets 16a and 16y are moved by the hydraulic jacks 58 and 52, respectively.

In order to ensure that the leading and trailing buckets 16a and 16y can move axially, the leading bucket 16a and the trailing bucket 16y cannot be secured using conventional keys disposed in grooves formed in the outer circumference of the rotor 10 and recesses in the sides of the bases of the buckets 16. Such keys cannot be fitted between the trailing bucket 16y and the closure bucket 16z or the closure bucket 16z and the leading bucket 16a due to the radial insertion of the closure bucket 16z. Furthermore, such keys do permit sufficient axial movement to allow axial expansion of the space between the leading bucket 16a and the trailing bucket 16y.

As shown in FIGS. 1–3, the present invention eliminates some of the standard keys, utilizing instead twist locks 30. At least, the female dovetails 12 below the closure bucket 16z, the leading bucket 16a and the trailing bucket 16y have axially oriented channels 24 formed at the bottom of each female dovetail.

The twist locks 30 each has a shaft 36, a full head 32 at one end of the shaft 36 and a partial head 34 at an opposite end of the shaft 36. The twist locks 30 may be inserted into the channels 24 before the male dovetails 14, or axial entry segment 22 may be slid axially into the female dovetails 12. The partial head 34 can be substantially semicircular with one flat side 38. At first, the twist locks 30 can be positioned as shown in FIG. 2, so that the partial head 34 has a first orientation, with the flat side 38 lying parallel to a tangent to the circumference of the rotor wheel 10. In this manner, the male dovetails 12 on the buckets 16 can be slid into the female dovetails 14 on the rotor wheel 10 over the partial heads 34. After the closure bucket 16z is in place and the axial entry segment 22 has been inserted, the twist locks 30 can be rotated 180° so that the partial head prevents the male dovetails 12 on the leading and trailing buckets 16a and 16y, respectively, and the axial entry segment 22 cannot move axially out of engagement with the female dovetails 14 on the rotor wheel 10.

In order to be able to move the leading bucket 16a and the trailing bucket 16y apart a sufficient distance to allow axial entry of the closure bucket 16z, the female dovetails 14 underneath the leading bucket 16a, trailing bucket 16y and the closure bucket 16z have channels 24 milled therein with twist locks 30 placed inside the channels 24 to lock the leading bucket 16a, trailing bucket 16y and the closure bucket 16z after insertion of the closure bucket 16z.

It may be possible that providing channels 24 underneath the leading bucket 16a, trailing bucket 16y and the closure bucket 16z will not provide sufficient freedom to move the leading bucket 16a and trailing bucket 16y apart a sufficient distance to permit the insertion of the closure bucket 16z. In such case, the two leading buckets 12a and 12b, and the two trailing buckets 12x and 12y can have channels 24 with twist locks 30 provided underneath the male dovetails 12. Furthermore, it is contemplated that up to seven twist locks 30 can be employed, three under the three leading buckets, one under the closure bucket 12z, and three under the three trailing buckets.

Having described several embodiments of the system and method for securing a radially inserted integral closure bucket to a turbine rotor wheel assembly having axially inserted buckets, according to the present invention, it is believed that other modifications, variations and changes will be suggested to those skilled in the art in view of the description set forth above, such as using other devices besides hydraulic jacks to apply axial force to the trailing and leading buckets. Such devices might include camming mechanisms, threaded mechanisms, or other mechanical devices. It is therefore to be understood that all such variations, modifications and changes are believed to fall within the scope of the invention as defined in the appended claims.

What is claimed is:

1. In a turbine having a rotor wheel with a plurality of female dovetails disposed around a circumference of the rotor wheel and a plurality of buckets having male dovetails and integral shrouds, a method of assembling the buckets comprising the steps of:

attaching said plurality of buckets serially to said rotor wheel by sliding said male dovetails into said female dovetails on said rotor wheel so that said integral shrouds on adjacent ones of said buckets nest together, leaving one female dovetail empty between a leading bucket and a trailing bucket;

providing a spreading fixture comprising first and second clamp assemblies, and spreading mechanism;

attaching said first clamp assembly to an integral shroud on said trailing bucket;

attaching said second clamp assembly to an integral shroud on said leading bucket;

disposing said spreading mechanism between said first and second clamp assemblies;

actuating said spreading mechanism to increase a space in a tangential direction between said first and second clamp assemblies and said leading and trailing buckets;

inserting a closure bucket, having an integral shroud at one end and a female dovetail on an opposite end, radially into said space between said leading and trailing buckets; and securing said closure bucket to said rotor wheel by inserting a dovetail segment, having generally radially opposing male dovetails, into said female dovetail on said closure bucket and said empty female dovetail between said leading bucket and said trailing bucket.

2. A method of assembling as recited in claim 1, further comprising the steps of:
   applying force to said leading bucket in a first axial direction; and
   applying force to said trailing bucket in a second opposite axial direction, to increase said space in a tangential direction prior to inserting said closure bucket.

3. A method of assembling as recited in claim 2, wherein said step of applying force to said leading bucket in said first axial direction comprises the steps of:
   positioning a hydraulic jack adjacent said trailing bucket; and
   actuating said hydraulic jack.

4. A method of assembling as recited in claim 3, wherein said hydraulic jack applies said force to a side of said male dovetail of said leading bucket.

5. A method of assembling as recited in claim 3, further comprising the step of attaching a leverage plate to said rotor wheel to provide a base that said hydraulic jack pushes against.

6. A method of assembling as recited in claim 2, wherein said step of applying force to said trailing bucket in said second opposite axial direction comprises the steps of:
   positioning a hydraulic jack adjacent said leading bucket; and
   actuating said hydraulic jack.

7. A method of assembling as recited in claim 6, wherein said hydraulic jack applies said force to a side of said male dovetail of said trailing bucket.

8. A method of assembling as recited in claim 6, further comprising the step of attaching a leverage plate to said rotor wheel to provide a base that said hydraulic jack pushes against.

9. A method of assembling as recited in claim 2, further comprising the steps of:
   providing a channel in the bottom of said empty female dovetail between said leading bucket and said trailing bucket, and the bottoms of said female dovetails adjacent said empty female dovetail between said leading bucket and said trailing bucket, into which said leading and trailing buckets are attached;
   inserting twist locks into each of said channels, said twist locks each having a shaft with a full head at one end of said shaft and a partial head at an opposite end of said shaft, so that said male dovetails on said buckets can be slid into said female dovetails on said rotor wheel over said partial head; and
   after said step of inserting said closure bucket, rotating said twist locks so that said partial head prevents said male dovetails on said buckets from moving out of said female dovetails on said rotor wheel.

10. A method of assembling as recited in claim 9, wherein said partial heads of said twist locks are substantially semicircular.

11. A method of assembling as recited in claim 9, wherein said step of providing said channels comprises providing said channels in said bottom of said empty female dovetail between said leading bucket and said trailing bucket, and bottoms of said female dovetails underneath at least two leading buckets and at least two trailing buckets.

12. A method of assembling as recited in claim 9, wherein said step of providing said channels comprises providing said channels in said bottom of said empty female dovetail between said leading bucket and said trailing bucket, and bottoms of said female dovetails underneath at least three leading buckets and at least three trailing buckets.

13. A method of assembling as recited in claim 2, further comprising the step of releasing said spreading fixture after said step of inserting said closure.

14. A method of assembling as recited in claim 13, further comprising the step of releasing said forces applied to said leading bucket in said first axial direction and said trailing bucket in said second opposite axial direction.

15. A method of assembling as recited in claim 2, further comprising the step of releasing said forces applied to said leading bucket in said first axial direction and said trailing bucket in said second opposite axial direction.

16. A method of assembling as recited in claim 1, further comprising the steps of:
   providing a channel in the bottom of said empty female dovetail between said leading bucket and said trailing bucket, and the bottoms of said female dovetails adjacent said empty female dovetail between said leading bucket and said trailing bucket, into which said leading and trailing buckets are attached;
   inserting twist locks into each of said channels, said twist locks each having a shaft with a full head at one end of said shaft and a partial head at an opposite end of said shaft, so that said male dovetails on said buckets can be slid into said female dovetails on said rotor wheel over said partial head; and
   after said step of inserting said closure bucket, rotating said twist locks so that said partial head prevents said male dovetails on said buckets and said dovetail segment from moving out of said female dovetails on said rotor wheel.

17. A method of assembling as recited in claim 16, wherein said partial heads of said twist locks are substantially semicircular.

18. A method of assembling as recited in claim 16, wherein said step of providing said channels comprises providing said channels in said bottom of said empty female dovetail between said leading bucket and said trailing bucket, and bottoms of said female dovetails underneath at least two leading buckets and at least two trailing buckets.

19. A method of assembling as recited in claim 16, wherein said step of providing said channels comprises providing said channels in said bottom of said empty female dovetail between said leading bucket and said trailing bucket, and bottoms of said female dovetails underneath at least three leading buckets and at least three trailing buckets.

20. A method of assembling as recited in claim 1, further comprising the steps of releasing said spreading fixture after said step of inserting said closure bucket.

21. A method of assembling as recited in claim 1, wherein said spreading mechanism comprises a pair of threaded rods and four nuts, said pair of rods extending through holes in each of said first and second clamps, said nuts being threaded on said threaded rods, a first pair of nuts, one nut threaded on each of said pair of threaded rods, being disposed adjacent said first clamp and a second pair of nuts, one nut threaded on each of said pair of threaded rods, being disposed adjacent said second clamp,
   wherein said actuating step comprises rotating said nuts on said pair of rods so that the distance between said pair of nuts adjacent said first clamp and said pair of nuts adjacent said second clamp increases to increase said space in said tangential direction.

22. In a turbine having a rotor wheel with a plurality of female dovetails disposed around a circumference of said rotor wheel and a plurality of buckets having male dovetails and integral shrouds, a method of assembling the buckets comprising the steps of:

attaching said plurality of buckets serially to said rotor wheel by sliding said male dovetails into said female dovetails on said rotor wheel so that said integral shrouds on adjacent ones of said buckets nest together, leaving one female dovetail empty between a leading bucket and a trailing bucket;

applying force to said leading bucket in a first axial direction; and applying force to said trailing bucket in a second opposite axial direction, to increase a space between said leading and trailing buckets in an axial direction; and inserting a closure bucket, having an integral shroud at one end and a female dovetail on an opposite end, radially into said space between said leading and trailing buckets; and securing said closure bucket to said rotor wheel by inserting a dovetail segment, having generally radially opposing male dovetails, into said female dovetail on said closure bucket and said empty female dovetail between said leading bucket and said trailing bucket.

23. A method of assembling as recited in claim 22, wherein said step of applying force to said trailing bucket in said second opposite axial direction comprises the steps of:

positioning a hydraulic jack adjacent said trailing bucket; and actuating said hydraulic jack.

24. A method of assembling as recited in claim 23, wherein said hydraulic jack applies said force to a side of said male dovetail of said leading bucket.

25. A method of assembling as recited in claim 22, wherein said step of applying force to said leading bucket in said first axial direction comprises the steps of:

positioning a hydraulic jack adjacent said leading bucket; and actuating said hydraulic jack.

26. A method of assembling as recited in claim 25, wherein said hydraulic jack applies said force to a side of said male dovetail of said trailing bucket.

27. In a turbine having a rotor wheel assembly comprising:

a plurality of female dovetails disposed around a circumference of said rotor wheel;

a plurality of buckets having male dovetails and integral shrouds, said plurality of buckets being attached serially to said rotor wheel by sliding said male dovetails into said female dovetails on said rotor wheel so that said integral shroud on adjacent ones of said buckets nest together, leaving one female dovetail empty between a leading bucket and a trailing bucket, a plurality of twist locks each comprising a shaft having a full head at one end of said shaft and a partial head at an opposite end of said shaft; and a plurality of channels disposed in the bottom of said empty female dovetail between said leading bucket and trailing bucket, and the bottoms of said female dovetails adjacent said empty female dovetail between said leading bucket and said trailing bucket, into which said leading and trailing buckets are attached; and a dovetail segment having opposing male dovetails;

wherein after a closure bucket is attached with said dovetail segment, said male dovetails on said buckets and said dovetail segment slide into said female dovetails on said rotor wheel over said partial heads, and said male dovetails on said buckets and said dovetail segment are prevented from moving axially out of said female dovetails on said rotor wheel by rotation of said twist locks so that said partial head overlaps a portion of said male dovetails on said buckets and said axial entry dovetail segment.

28. A system of securing said buckets as recited in claim 27, wherein said partial heads of said twist locks are substantially semicircular.

29. A system of securing said buckets as recited in claim 27, wherein said full heads of said twist locks are substantially circular.

30. A system of securing said buckets as recited in claim 27, wherein said channels are provided in said bottom of said empty female dovetail between said leading bucket and said trailing bucket, and bottoms of said female dovetails underneath at least two leading buckets and at least two trailing buckets.

31. A system of securing said buckets as recited in claim 27, wherein said channels are provided in said bottom of said empty female dovetail between said leading bucket and said trailing bucket, and bottoms of said female dovetails underneath at least three leading buckets and at least three trailing buckets.

* * * * *